United States Patent
Kim et al.

(10) Patent No.: US 8,331,320 B2
(45) Date of Patent: Dec. 11, 2012

(54) FAST SERVING CELL CHANGE METHOD AND APPARATUS FOR MOBILE COMMUNICATION SYSTEM

(75) Inventors: Young Bum Kim, Seoul (KR); Youn H. Heo, Suwon-si (KR); Ju Ho Lee, Suwon-si (KR); Kundan Kumar Lucky, Bangalore (IN)

(73) Assignee: Samsung Electronics Co., Ltd (KR)

( * ) Notice: Subject to any disclaimer, the term of this patent is extended or adjusted under 35 U.S.C. 154(b) by 701 days.

(21) Appl. No.: 12/491,811

(22) Filed: Jun. 25, 2009

(65) Prior Publication Data

US 2009/0323639 A1    Dec. 31, 2009

(30) Foreign Application Priority Data

Jun. 27, 2008   (KR) ............................. 0061791/2008

(51) Int. Cl.
H04W 4/00 (2009.01)
(52) U.S. Cl. .................. 370/331; 370/400; 455/436
(58) Field of Classification Search .......... 370/328–329, 370/331–333, 340–343, 345, 400–401, 437, 370/441–442; 455/422.1, 436–440, 442
See application file for complete search history.

(56) References Cited

U.S. PATENT DOCUMENTS

| | | | |
|---|---|---|---|
| 6,181,686 B1 * | 1/2001 | Hamalainen et al. | 370/347 |
| 7,519,384 B2 * | 4/2009 | Vaittinen et al. | 455/522 |
| 7,710,922 B2 * | 5/2010 | Lundh et al. | 370/331 |
| 7,925,264 B2 * | 4/2011 | Craig | 455/439 |
| 7,957,349 B2 * | 6/2011 | Kim et al. | 370/331 |
| 2005/0094600 A1 * | 5/2005 | Zhang et al. | 370/331 |
| 2007/0115796 A1 * | 5/2007 | Jeong et al. | 370/203 |
| 2008/0227442 A1 * | 9/2008 | Pani et al. | 455/422.1 |
| 2008/0267131 A1 * | 10/2008 | Kangude et al. | 370/331 |
| 2009/0196252 A1 * | 8/2009 | Fischer | 370/331 |
| 2009/0219890 A1 * | 9/2009 | Zhang et al. | 370/331 |
| 2009/0219893 A1 * | 9/2009 | Korpela et al. | 370/332 |
| 2009/0238116 A1 * | 9/2009 | Chaponniere et al. | 370/328 |
| 2010/0067483 A1 * | 3/2010 | Ahluwalia | 370/331 |
| 2010/0074227 A1 * | 3/2010 | Boncz et al. | 370/331 |
| 2010/0238903 A1 * | 9/2010 | Kitazoe | 370/332 |

* cited by examiner

*Primary Examiner* — Chi H. Pham
*Assistant Examiner* — Kevin Mew
(74) *Attorney, Agent, or Firm* — The Farrell Law Firm, P.C.

(57) ABSTRACT

A serving cell change method and apparatus is provided for efficiently performing the serving cell change in a mobile communication system. The UE receives a cell change control information including an activation time from a serving cell, when a downlink channel status of the serving cell is inferior to a downlink channel status of a target cell, reports a measurement result to the serving cell while performing data communication with the serving cell, monitors receipt of a cell change indicator transmitted by the target cell before the expiration of the activation time while performing the data communication with the serving cell, and when the cell change indicator is received, communicates data with the target cell by sending an acknowledgement in response to the cell change indicator and switching to the target cell.

12 Claims, 12 Drawing Sheets

FAST SERVING CELL CHANGE METHOD AND APPARATUS FOR MOBILE COMMUNICATION SYSTEM

PRIORITY

This application claims priority to an application entitled "FAST SERVING CELL CHANGE METHOD AND APPARATUS FOR MOBILE COMMUNICATION SYSTEM" filed in the Korean Intellectual Property Office on Jun. 27, 2008 and assigned Serial No. 10-2008-0061791, the contents of which are incorporated herein by reference.

BACKGROUND OF THE INVENTION

1. Field of the Invention

The present invention relates to a mobile communication system and, in particular, to a fast serving cell change method and apparatus in a High Speed Downlink Packet Access (HSDPA) communication system.

2. Description of the Related Art

The Universal Mobile Telecommunications System (UMTS), which is built on the Global System for Mobile Communications (GSM) and the General Packet Radio Services (GPRS) networks with the integration of Wideband Code Division Multiple Access (WCDMA) technology, aims to provide the mobile and computer users with broadband packet-based services including text messaging, voice, and other multimedia services under the universal connectivity concept.

UMTS systems have evolved with the introduction of High Speed Downlink Packet Access (HSDPA) that improves the downlink transfer speed, i.e. the data rate from a base station (Node B) to a User Equipment (UE). In order to secure a stable and fast data transfer speed, HSDPA uses Adaptive Modulation and Coding (AMC) and Hybrid Automatic Repeat reQuest (HARQ). In AMC, the modulation and combining scheme is adaptively selected among Quadrature Phase Shift Keying (QPSK), 16 Quadrature Amplitude Modulation (QAM), and 64 QAM, on a per-user basis. HARQ can be implemented with a short Transmission Time Interval (TTI) and soft combining. That is, when the data is not successfully received and thus the HARQ is triggered between the Node B and the UE, the UE performs soft combining to recover, thereby improving the overall communication efficiency. With respect to the operation of the HARQ, the Node B and UE exchange various control information such as an Orthogonal Variable Spreading Factor (OVSF) code and a block size for the UE, channel quality information for determining the modulation scheme adaptive to the channel quality and modulation scheme information, and channel number and ACKnowledge/Negative AC Knowledge (ACK/NACK) information.

FIG. 1 is a diagram illustrating an asynchronous HSDPA communication system.

In FIG. 1, the asynchronous HSDPA system includes a Core Network (CN) 100, a plurality of Radio Network Subsystems (RNS's) 110 and 120, and a User Equipment (UE) 130.

The RNS 110 includes a Radio Network Controller (RNC) 111 and a plurality of Node B's 113 and 115; and the RNS 112 includes an RNC 112 and a plurality of Node B's 114 and 116. Each Node B is composed of a plurality of cells. Here, the term "Node B" is used interchangeably with the term "base station" for simplification purpose. The RNC is responsible for managing radio resources and can be referred to as a Serving RNC (SRNC), Drift RNC (DRNC), or Controlling RNC (CRNC) according to its role in the network. The SRNC and DRNC are determined according to their roles with respect to the UE, i.e. the SRNC is responsible for managing the information on the UE and communicating data with the CN 100 and the DRNC is responsible for relaying the data between the UE and SRNC. The CRNC is an RNC which controls each Node B. Referring to FIG. 1, when the RNC 111 manages the information on the UE 130, the RNC 111 becomes the SRNC to the UE 130. If the Node B 130 moves such that the data is relayed by the RNC 112, the RNC 112 becomes the DRNC to the UE 130. The RNC 111 controlling the Node B113 becomes the CRNC of the Node B 113.

The RNC and Node B are connected to each other via the Iub interface, and the RNCs are connected to each other via the Iur interface. The RNC and CN are connected to each other via Iu interface. The cell to which the UE is connected is referred to as the serving cell. In FIG. 1, the cell 117 to which the UE 130 is connected is the serving cell of the UE 130. Accordingly, when the UE moves to another cell, the cell to which the user equipment moves and attaches thereto becomes a new serving cell of the UE.

FIG. 2 is a diagram illustrating a serving cell change scenario in the asynchronous HSDPA system of FIG. 1. In the scenario depicted in FIG. 2, a UE 230 connected to the CN 200 via a cell 217 of the Node B 213 controlled by the SRNC 211 moves to the cell 218 of the Node B 214 controlled by the DRNC 212 such that the cell 218 becomes the serving cell of the UE 230. Once the serving cell is changed, the DRNC 212 manages the radio resource of the UE 230, and the SRNC 211 establishes a connection between the UE 230 and the CN 200 via the DRNC 212.

A serving cell change procedure in the conventional HSDPA system is described hereinafter with reference to FIG. 3. FIG. 3 is a message flow diagram illustrating a conventional serving cell change procedure of the HSDPA system.

Referring to FIG. 3, a UE 301 communicates data with the source cell 302 in step S306. The source cell is an old serving cell of the UE before the serving cell change, and the target cell is a new serving cell after the serving cell change. The UE 301 monitors the channel status by measuring the pilot signals broadcasted by the adjacent cells and reports to the RNC 304 the channel status periodically or when the signal strength of either the source cell or target cell is greater than a predetermined threshold value. The measured signal strength is delivered to the RNC 304 via the source cell in the form of a Radio Resource Control (RRC) message in step S308. The RNC 304 determines whether to maintain the source cell as the serving cell of the UE 301 or change the serving cell to the target cell 303 based on the RRC message. Typically, the RNC 304 that determines the serving cell change is the SRNC to the UE 301. When the downlink channel status of the target cell 303 is superior to that of the source cell 302 above the threshold value, the RNC 304 determines a serving cell change from the source cell 302 to the target cell 303. Once it is determined to change the serving cell, the serving cell change procedure is performed, in a sequential order in that the RNC 304 instructs the target cell 303 to prepare the radio link reconfiguration in step S310, the target cell 303 reports the radio link reconfiguration ready to the RNC 304 in step S312, and then the RNC 304 commits the target cell 303 to the radio link reconfiguration in step S314. Next, the RNC 304 sends a radio bearer reconfiguration message to the UE 301 in step S316. At this time, the radio bearer reconfiguration message is delivered to the UE 301 via the source cell 302. With the receipt of the radio bearer reconfiguration message, the UE 301 recognizes that the serving cell change from the source cell 302 to the target cell 303 has been confirmed, thereby completing the serving cell change in step S318 and sending a radio bearer reconfiguration complete message to the RNC 304 in step S320. At this time, the radio bearer reconfiguration complete message is delivered to the RNC 304 via the target cell 303. As a consequence, the UE 301 communicates data with the target cell 303 as a new serving cell in step S324.

In order to secure communication reliability, the serving cell change process should be performed seamlessly with the minimization of transmission latency. Particularly in the case of a real time service such as voice communication, the transmission latency is one of the critical factors to determining the service quality. However, the conventional serving cell change method explained with reference to FIG. 3 has its drawbacks.

One of the drawbacks is caused because the RNC sends the radio bearer reconfiguration message to the UE via the source cell in the format of an RRC message. Despite that the serving cell change from the source cell to the target cell is determined since the channel quality of the target cell is superior to that of the source cell, the RNC sends the radio bearer reconfiguration message via the source cell having relatively bad channel status, whereby the probability of successful receipt of the radio bearer reconfiguration message decreases and, in consequence, causes transmission delay and packet loss.

Also, when the radio bearer reconfiguration message is successfully received, the UE feeds back the radio bearer reconfiguration complete message to the RNC and this feedback process causes further data transmission delay.

SUMMARY OF THE INVENTION

In order to solve the problems of the prior art, the present invention provides a fast serving cell change method for a mobile communication system.

Also, the present invention provides a serving cell change method and apparatus that is capable of quickly changing the serving cell with an efficient signaling procedure in a mobile communication system.

Also, the present invention provides a serving cell change method and apparatus that is capable of a fast serving cell change by defining efficient operation of the user equipment involved in the serving cell change procedure.

Also, the present invention provides a serving cell change method and apparatus that is capable of quickly changing the serving cell with an efficiently defined message format.

In accordance with an embodiment of the present invention, a cell change method for a user equipment in a mobile communication system includes receiving cell change control information including an activation time from a serving cell; when a downlink channel status of the serving cell is inferior to a downlink channel status of a target cell, reporting to the channel status to the serving cell while performing data communication with the serving cell; monitoring receipt of a cell change indicator transmitted by the target cell before the expiration of the activation time while performing the data communication with the serving cell; and when the cell change indicator is received, communicating data with the target cell by sending an acknowledgement in response to the cell change indicator and switching to the target cell.

In accordance with another embodiment of the present invention, a cell change method for a mobile communication system includes sending, by a serving cell, neighbor cell information including an activation time; receiving a downlink channel status of a user equipment from the serving cell and determining a difference between channel statuses of the serving cell and a target cell; when the channel status of the target cell is superior to the channel status of the source cell, sending a cell change instruction to the serving and target cells; sending, by the target cell, a cell change indicator to the user equipment in response to the cell change instruction while communicating data with the serving during the activation time; and changing connection from the serving cell to the target cell by acknowledgement of the user equipment.

In accordance with another embodiment of the present invention, a cell change apparatus of a user equipment in a mobile communication system includes a receiver which extracts neighbor cell information including activation time from a received signal and control information including a serving cell change indicator from a signal transmitted by a target cell during the activation time; a serving cell change controller which controls the user equipment to communicate data with the serving cell, reports a measurement result to the serving cell when a downlink channel status of the serving cell is inferior to a downlink channel status of the target cell, maintains the data communication with the serving cell after reporting the measurement result, monitors receipt of the cell change indicator transmitted by the target cell, sends the target cell a cell change acknowledgement in response to the cell change indicator, and changes connection from the serving cell to the target cell for data communication; and a transmitter which generates control information of the user equipment and sends the control information under the control of the serving cell change controller.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Embodiments of the present invention are described with reference to the accompanying drawings. The same reference numbers are used throughout the drawings to refer to the same or like parts. Detailed descriptions of well-known functions and structures incorporated herein may be omitted to avoid obscuring the subject matter of the present invention. The terms used in the following description are defined taking into consideration the functions obtained in accordance with the present invention. The definitions of these terms should be determined based on the content of this specification, and may be changed in accordance with the option of a user or a usual practice.

While the present invention is particularly directed to a UMTS telecommunication system supporting the HSDPA service and thus is described with specific reference thereto, it is appreciated that the present invention can be applied in other communication systems such as a Long Term Evolution (LTE) system.

The present invention provides a serving cell change method for an HSDPA system in which the UE switches to a target cell in a preset activation time (or pre-configured delay) which is determined depending on whether the cell is under the control of an SRNC or a DRNC during the serving cell change procedure, resulting in fast serving cell change and reduction of dropped call rate.

1. First Embodiment

Figure 1:
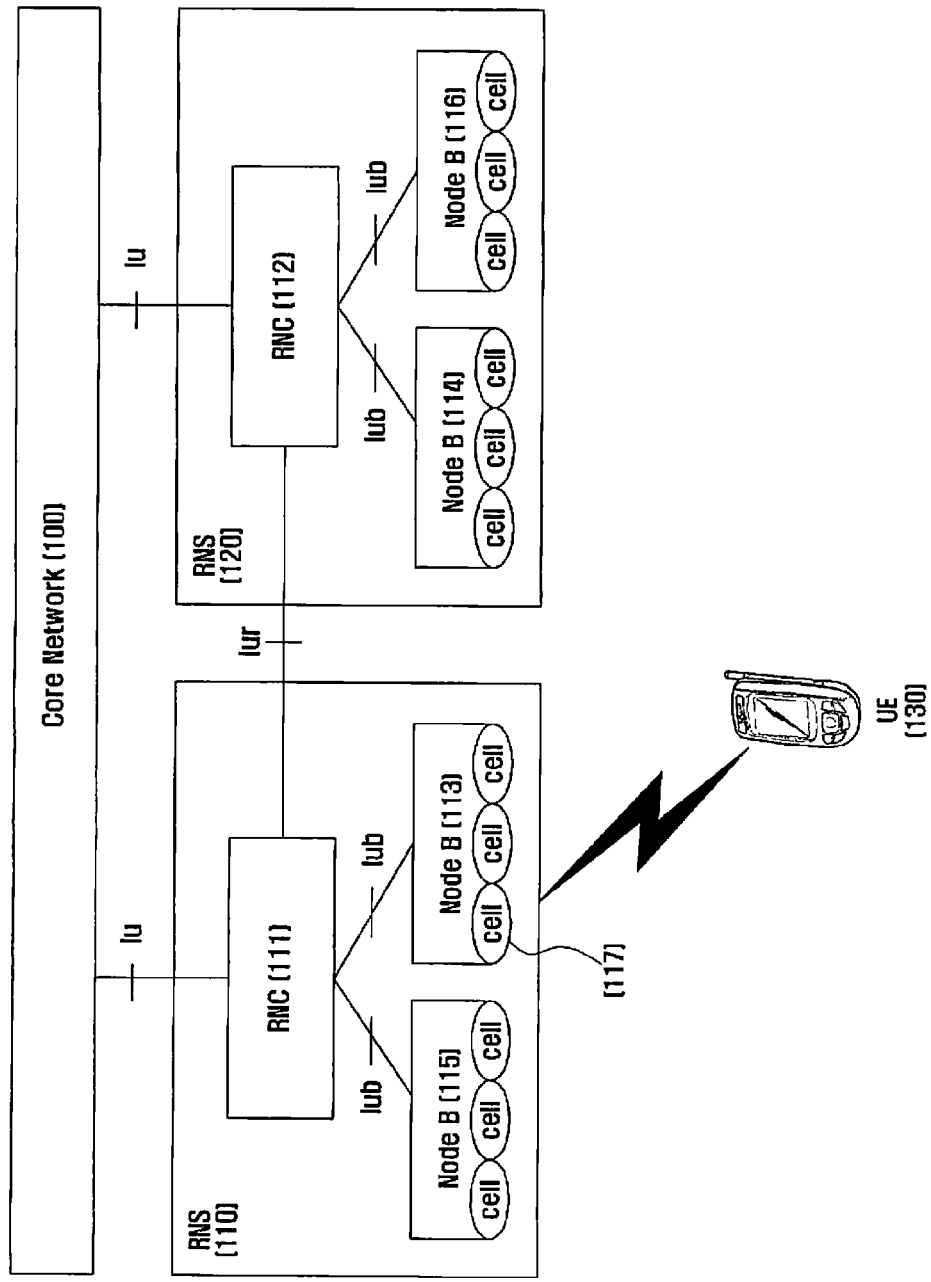
FIG. 1 is a diagram illustrating an asynchronous HSDPA communication system.
Figure 2:
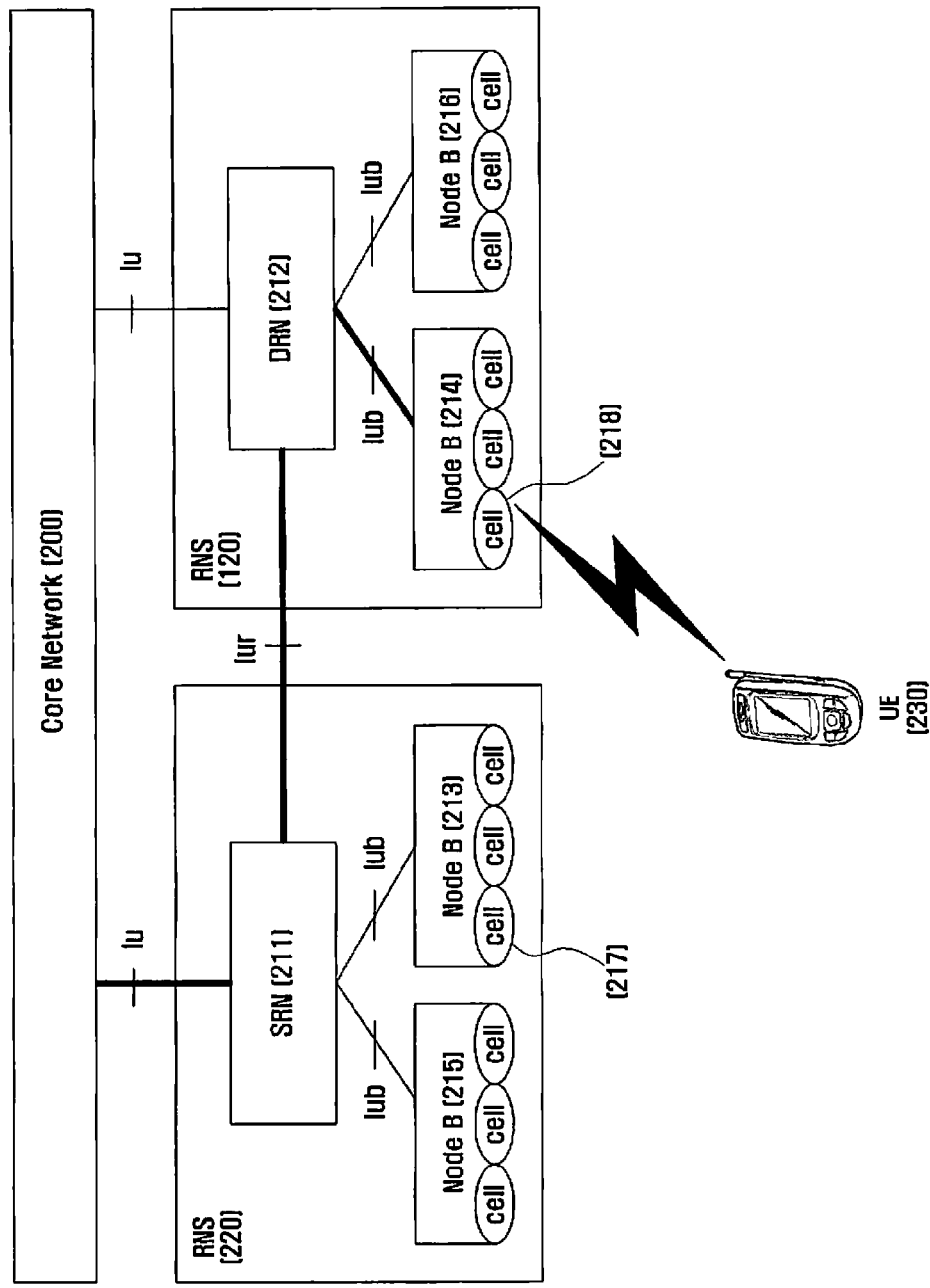
FIG. 2 is a diagram illustrating a serving cell change scenario in the asynchronous HSDPA system of FIG. 1.
Figure 3:
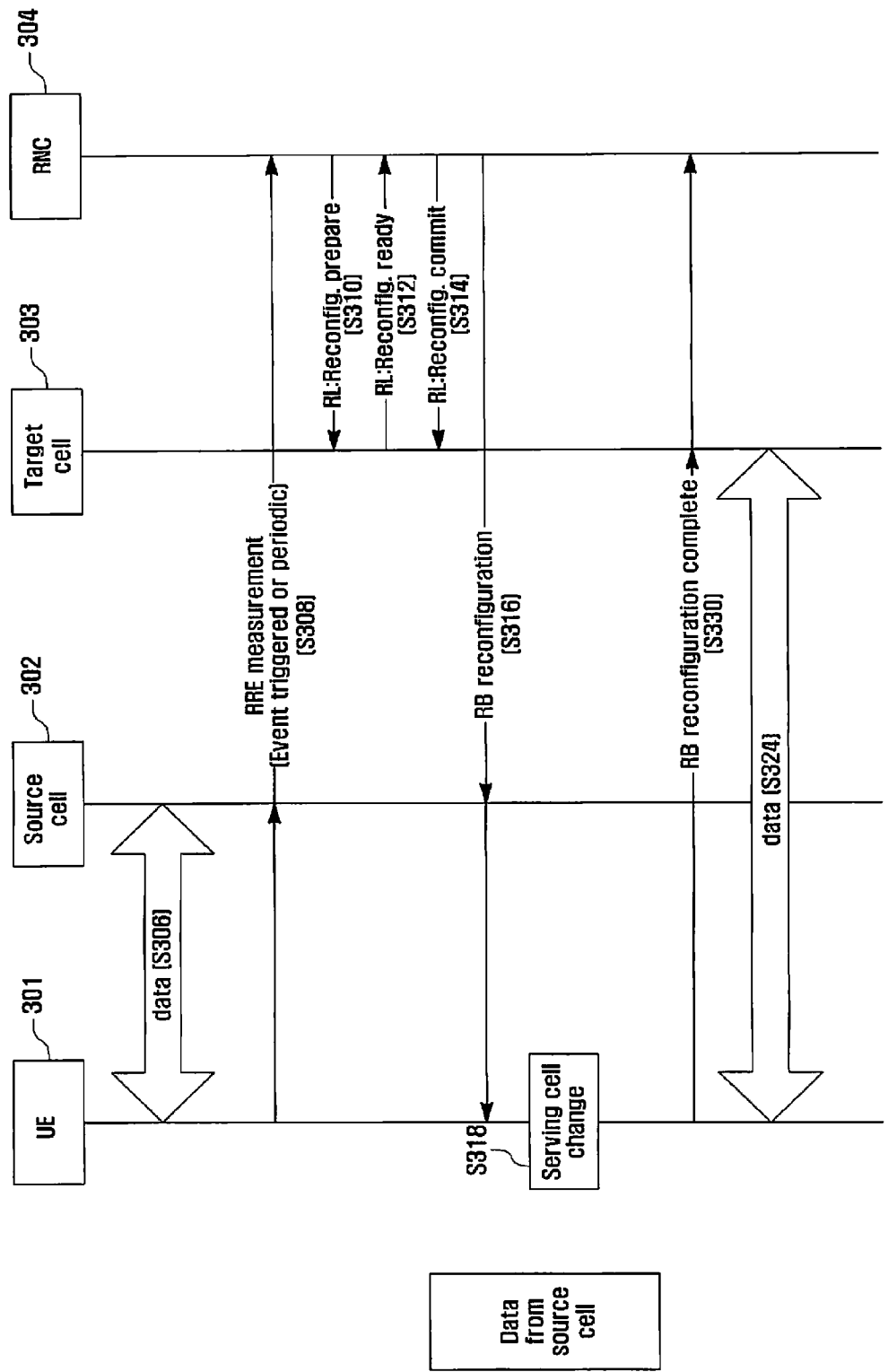
FIG. 3 is a message flow diagram illustrating a conventional serving cell change procedure of the HSDPA system.
Figure 4:
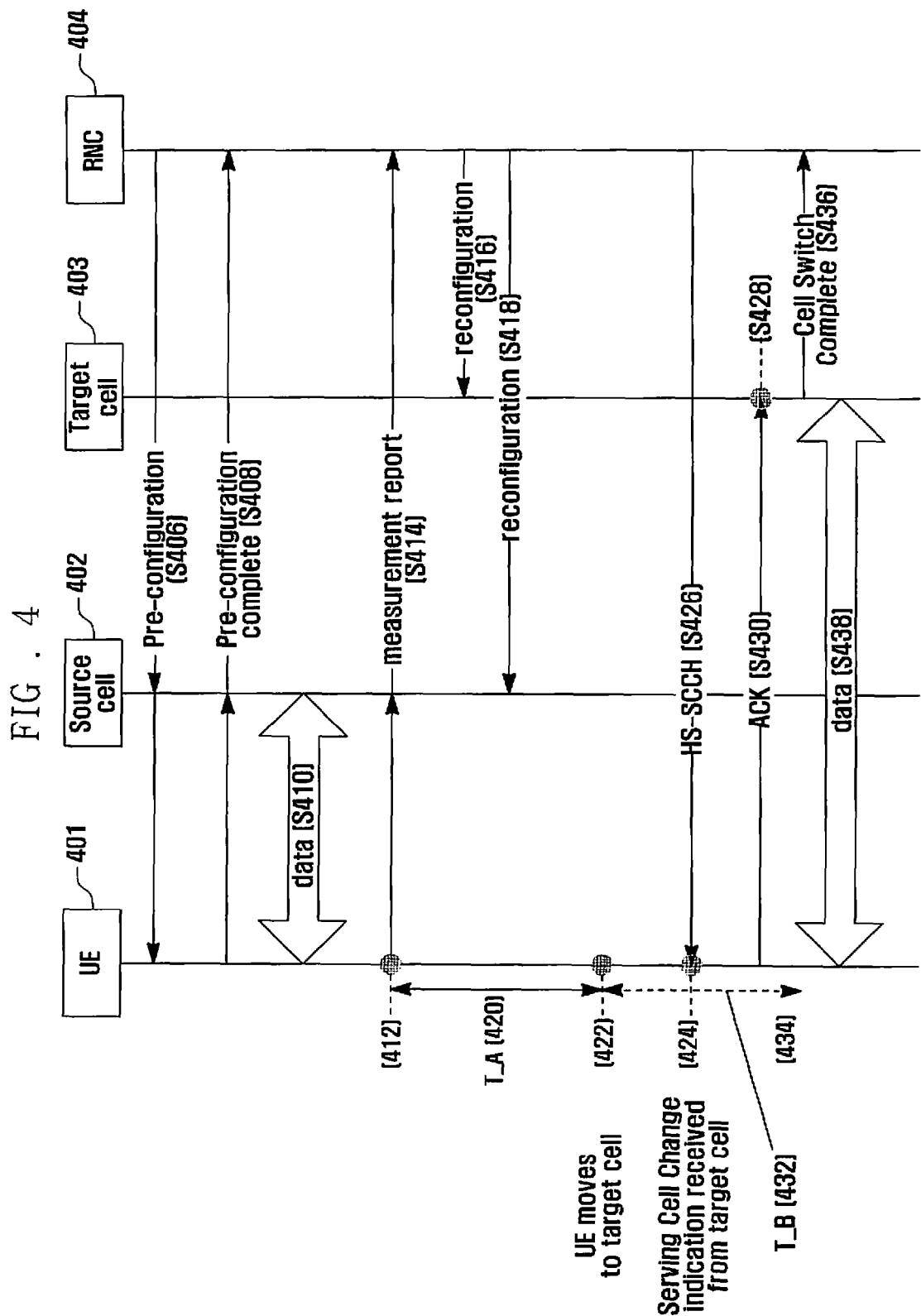
FIG. 4 is a message flow diagram illustrating a serving cell change method according to an embodiment of the present invention.

A serving cell change method according to an embodiment of the present invention is described hereinafter with reference to FIG. 4. FIG. 4 is a message flow diagram illustrating a serving cell change method according to an embodiment of the present invention.

Referring to FIG. 4, the RNC 404 first sends a pre-configuration message containing serving cell change-related control information to the UE 401 via RRC signaling in step S406. The serving cell change-related RRC signaling message is delivered to the UE 401 via the source cell 402 during a radio bearer establishment/reconfiguration procedure or an active set update procedure. The serving cell change control information contains timing information indicating the time period T_A 420 for the UE to obtain the cell change timing. In this embodiment, the time period T_A 420 is defined for each cell within the active set listing potential cells to which the UE 401 can change its connection and determined based on the relative location of the cell to the UE in the network. Since it takes a relatively long time to perform the cell change to the target cell under the control of the DRNC in comparison with the cell under the control of the SRNC, the T_A of the cell under the control of the DRNC is set to a value greater than that of the cell under the control of the SRNC. That is, the time period T_A 420 is determined differently depending on whether the target cell is under the control of the DRNC or the SRNC. In another way, the time period T_A 420 can be set per group by grouping the cells listed in the active set. For instance, the cells are divided into the DRNC cell group and SRNC cell group and hence the time period T_A 420 is set by the cell group. If the serving cell change-related RRC signaling message is received, the UE 401 sends a pre-configuration complete message to the RNC 404 via the source cell 402 as a reply in step S408. Next, the UE 401 measures the signal strengths of the pilot signals broadcasted by the cells of the active set while communicating data with the source cell 402 in step S410.

The UE 401 reports to the RNC 404 the downlink channel status of the adjacent cells periodically or when the difference between the pilot signal strengths of the source and target cells 402 and 403 is greater than a predetermined threshold value. In FIG. 4, the UE 401 reports the measurement results to the RNC 404 via the source cell 402 in the form of a Radio Resource Control (RRC) message at the time point referred to as reference number 412 in step S414. The measurement report contains information on the target cell within the active set and a Connection Frame Number (CFN) value calculated from the T_A value preset for the target cell as well as the channel status of the target cell. The CFN indicates the timing for the UE to switch to the target cell in unit of the radio frame or Transmission Time Interval (TTI). That is, the T_A value, which is a real number, is converted into a number of the data transmission units to obtain the timing of the cell change. Accordingly, the RNC 404 can check the UE's cell change time point from the CFN value.

The RNC 404 sends the radio link reconfiguration message to both the target cell 403 and the source cell 402 in steps S416 and S418 and thus the target and source cells 403 and 402 to reconfigure their radio links.

Next, the UE 401 moves to the target cell 403 at the time 422 calculated by adding the T_A value 420 of the target cell 403 to the time at which the measurement report RRC message is transmitted and monitors receipt of the serving cell change indication signal transmitted by the target cell 403. The time point 422 corresponds to the CFN obtained from the T_A value preset for the target cell.

The RNC 404 determines, based on the measurement report RRC message received from the UE 401, whether to maintain the connection with the source cell 402 or change the connection to the target cell 403. When the downlink channel status of the target cell 403 is better than that of the source cell 402 and the difference of the channel statuses is greater than a predetermined threshold value, the RNC 404 determines to change the connection from the source cell 402 to the target cell 403. Once the serving cell change is determined, the target cell 403 sends the serving cell change indication signal to the UE 401 after the time point 422 through a downlink control channel, i.e. High Speed Shared Control Channel (HS-SCCH). In FIG. 4, the UE 401 receives the serving cell change indication signal via the HS-SCCH at the time point 424 in step S426 and sends a serving cell change acknowledgement signal to the target cell 403 in response to the serving cell change indication signal in step S430. The target cell 403 receives the serving cell change acknowledgement signal at the time point 428. The serving cell change acknowledgement signal can be transmitted in the form of a specific codeword of Channel Quality Information (CQI) for HSDPA or piggybacked on the uplink data. Upon receipt of the acknowledgement signal, the target cell 403 sends a cell change complete message to the RNC 404 in step S436 and starts data communication with the UE 401 in step S438.

When the UE 401 fails to receive the serving cell change indication signal during the time period T_B 432 between the time point 422 at which the UE 401 changes its connection from the source cell to the target cell and the time point 434, the UE 401 maintains the connection to the source cell 402 and attempts data communication with the source cell 402. The time period T_B 432 is transmitted to the UE 401 through the serving cell change-related RRC signaling message together with the T_A 420 and can be converted into a value of CFN indicating a specific point in time.

The target cell 403 sends the serving cell change indicator to the UE 401 during the period T_B 432 in step S426. The serving cell change indicator can be transmitted repeatedly until the serving cell change acknowledgement signal is received from the UE 401.

Figure 5:
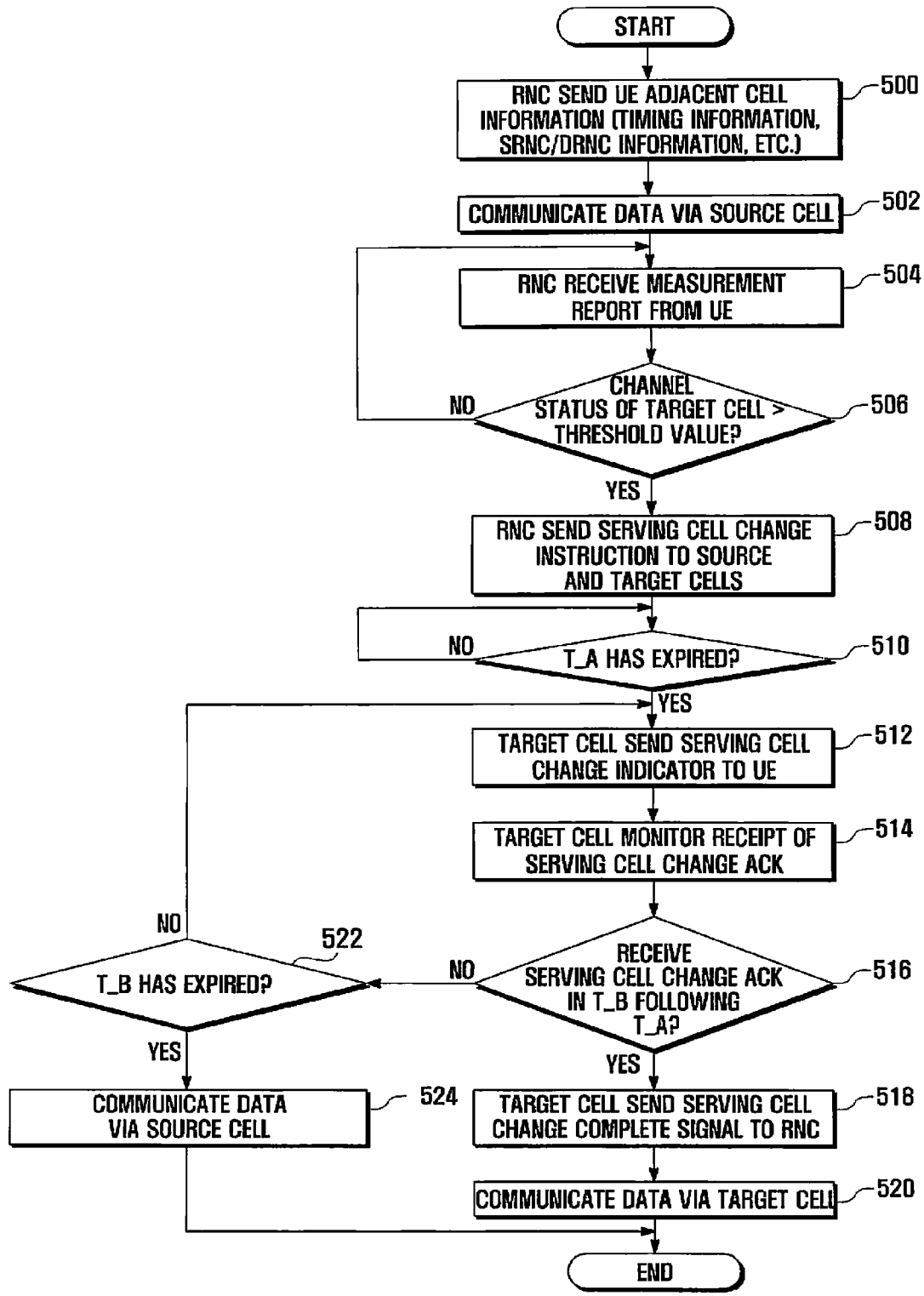
FIG. 5 is a flowchart illustrating the serving cell change method of FIG. 4 in view of the network.

FIG. 5 is a flowchart illustrating the serving cell change method of FIG. 4 in view of the network.

Referring to FIG. 5, the RNC first sends the UE a serving cell change-related control information on the cells of the active set in step S500. The control information includes timing information, i.e. the time period (T_A value) of each cell. The T_A is defined with at least two different values determined based on the relative location of the cell to the UE in the network.

Since it takes a relatively long time to perform the cell change to the target cell under the control of the DRNC in comparison with the cell under the control of the SRNC, the T_A of the cell under the control of the DRNC is set to a value greater than that of the cell under the control of the SRNC. That is, the T_A for each cell is set to one of the lengths predefined for the DRNC or SRNC. The timing information signaling to the UE can be performed in various manners. First, the RNC informs the UE of the absolute values. Second, the RNC informs the UE of whether each cell belongs to the SRNC or DRNC such that the UE selects one of the time values preset for the SRNC and DRNC. Third, the RNC informs the UE of whether each cell belongs to the SRNC or DRNC together with an offset value such that the UE sets the T_A to a preset value for the cell of the SRNC and to a value obtained by adding the offset to the preset value for the cell of the DRNC. Fourth, the RNC informs the UE of whether each cell belongs to the SRNC or DRNC together with an absolute value for the cell of the SRNC and an offset value for the cell of the DRNC such that the UE acquires the value of the T_A for the cells of the SRNC and DRNC.

In third and fourth cases, the RNC provides an offset for the cells of the DRNC such that the UE can acquire the period T_A for the cells under the control of the DRNC.

The source cell communicates data with the UE in step S502, and the RNC receives a measurement report transmitted by the UE in step S504. Upon receipt of the measurement report, the RNC determines whether the channel status of the target cell is superior to that of the source cell and whether the difference of the channel status is greater than a threshold value in step S506. If either the channel status of the target cell is superior to that of the source cell but the difference is not greater than the threshold value or the channel status of the target cell is not superior to that of the source cell, the RNC waits for the next measurement result in step S504. Otherwise, if the channel status of the target cell is superior to that of the source cell and the difference of the channel status is greater than the threshold value, the RNC instructs the source and target cells to prepare for the serving cell change in step S508 and determines whether the time period T_A has elapsed from the point in time at which the UE has sent the measurement report in step S510. Checking of the time is repeated until the elapse of the time period T_A is detected. If the time period T_A has elapsed from the measurement report transmission time, the target cell sends a serving cell change indicator to the UE in step S512. The serving cell change indicator is transmitted through a downlink control channel defined in the HSDPA standard, i.e. HS-SCCH. After transmitting the cell change indicator, the target cell waits for receiving a serving cell change acknowledgement signal that is transmitted by the UE In step S514. The serving cell change acknowledgement signal can be transmitted in the form of a specific codeword of the CQI control information for HSDPA or by piggybacking on the uplink data. After step S512, the source cell stops communicating data with the UE. The target cell determines whether the serving cell change acknowledgement signal is received in the period T_B following the period T_A in step S516. If the serving cell change acknowledgement signal is received in the period T_B, the target cell sends the RNC a serving cell change complete message in step S518 and communicates data with the UE in step S520. Otherwise, if the serving cell change acknowledgement signal is not received in the period T_B determines whether the period T_B following the period T_A has expired in step S522. If the T_B has not expired, the target cell sends the serving cell change indicator to the UE again at step S512. Otherwise, if the period T_B following the period T_A has expired, the source cell communicates the data with the UE in step S524.

Figure 6:
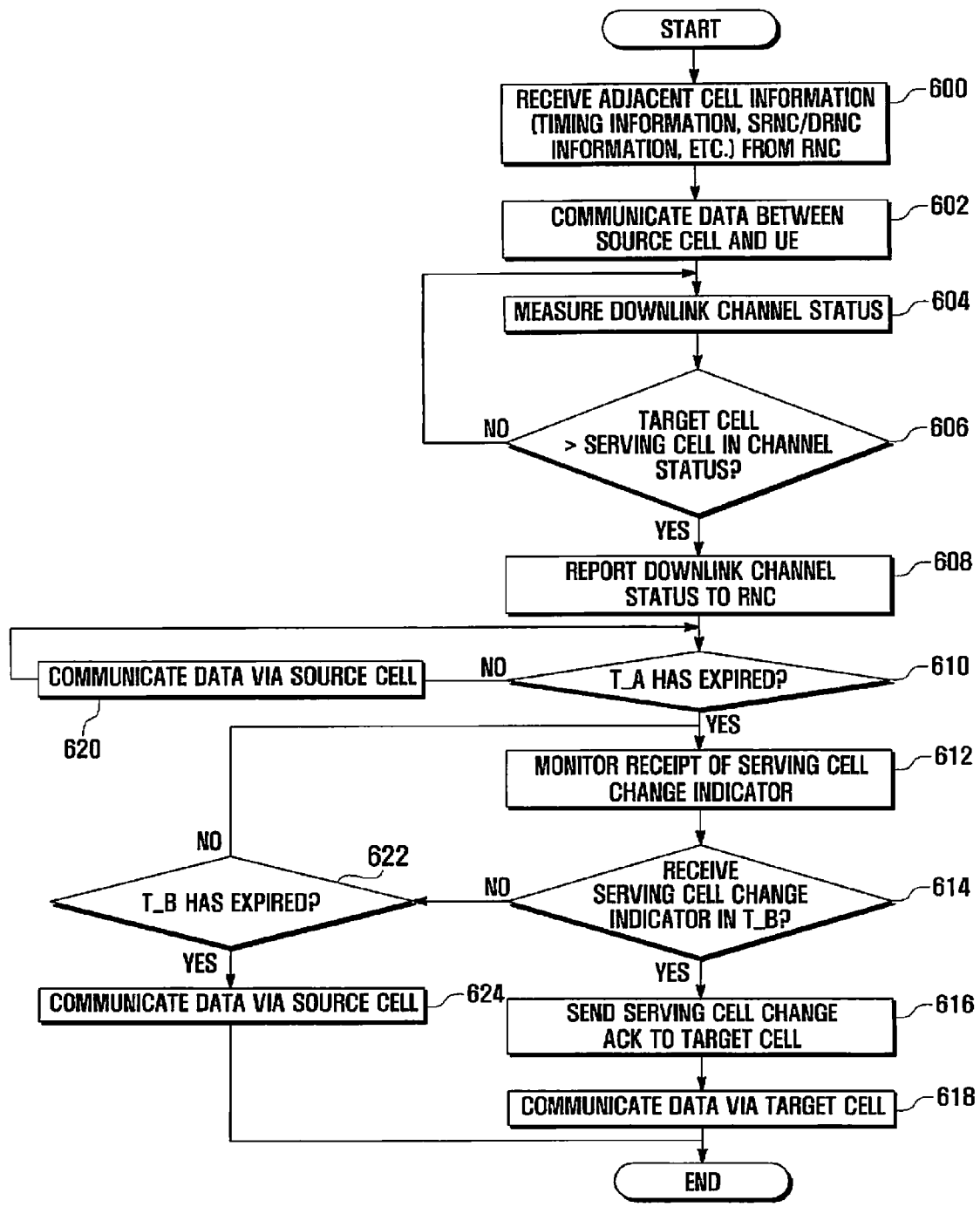
FIG. 6 is a flowchart illustrating the serving cell change method of FIG. 4 in view of the UE.

FIG. 6 is a flowchart illustrating the serving cell change method of FIG. 4 in view of the UE.

Referring to FIG. 6, the UE receives the serving cell change-related control information transmitted by the RNC in step S600. The control information contains the timing information, i.e. the period T_A per cell. The T_A is defined at least two different values determined based on the relative location of the corresponding cell to the UE in the network.

Next, the UE communicates data with the source cell in step S602, collects downlink channel status information by measuring the strengths of pilot signals transmitted by adjacent cells in step S604, and determines whether there is a cell of which channel status is superior to that of the source cell in step S606. If there is no cell of which channel status is superior to that of the source cell or the measurement report time has not arrived, the UE repeats collecting channel status information at step S604.

Otherwise, if there is a cell of which channel status is superior to that of the source cell, the UE the measurement result to the RNC in step S608. Here, the cell of which channel status is superior to that of the source cell becomes the target cell. After reporting the measurement result, the UE determines whether the time period T_A has elapsed from the time point at which the measurement reported is transmitted in step S610. If the time period T_A has not elapsed, the UE maintains the connection to the source cell 620 in step S620 while monitoring the elapse of the time period T_A at step S610.

Otherwise, if the time period T_A has elapsed, the UE monitors receipt of a serving cell change indicator transmitted by the target cell in step S612 and determines whether the serving cell change indicator is successfully received in the time period T_B following the time period T_A in step S614. If the serving cell change indicator is successfully received in the time period T_B, the UE sends a serving cell change acknowledgement signal to the target cell in step S616. As a consequence, the UE changes its connection to the target cell in step S618. If the UE fails receiving the serving cell change indicator at step S614, the UE determines whether the time period T_B starting from the end of the time period T_A has expired in step S622. The time period T_B has not expired, the process goes to step S612 to wait for receiving the serving cell change indicator. Otherwise, if the time period T_B has expired, the UE maintains the connection to the source cell in step S624.

Figure 7:
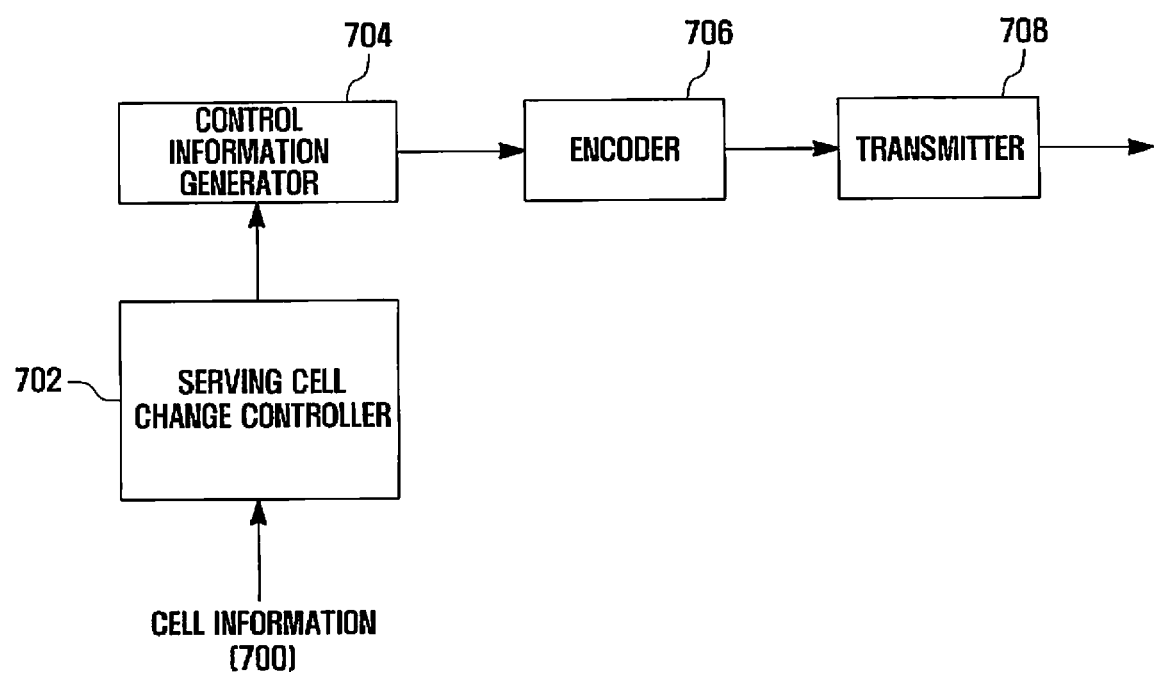
FIG. 7 is a block diagram illustrating a configuration of a signaling transmission apparatus of the RNC for transmitting the serving cell change-related control information according to an embodiment of the present invention.

FIG. 7 is a block diagram illustrating a configuration of a signaling transmission apparatus of the RNC for transmitting the serving cell change-related control information according to an embodiment of the present invention. For explanation simplicity, descriptions on other internal blocks, except for the signaling transmission apparatus of the RNC, are omitted.

Referring to FIG. 7, the signaling transmission apparatus includes a serving cell change controller 702, a control information generator 704, an encoder 706, and an RF transmitter 708. The serving cell change controller 702 receives the cell information 700 on the cells within the active set of the UE and controls the control information generator 704 to generate serving cell change control information based on the cell information. The serving cell change control information includes the per-cell T_A which implies the point in time at which the UE is to perform the serving cell change. The time period T_A is defined for each cell in the active set including potential target cells, and the serving cell change controller 702 determines the T_A based on the relative location of the UE to the cell in the network. The control information generator 704 generates the control information containing the serving cell change-related information in an appropriate format and outputs the control information to the encoder 706. The encoder 706 performs a channel coding on the control information for improving communication reliability, and the RF transmitter 708 processes and transmits the channel encoded control information.

Figure 8:
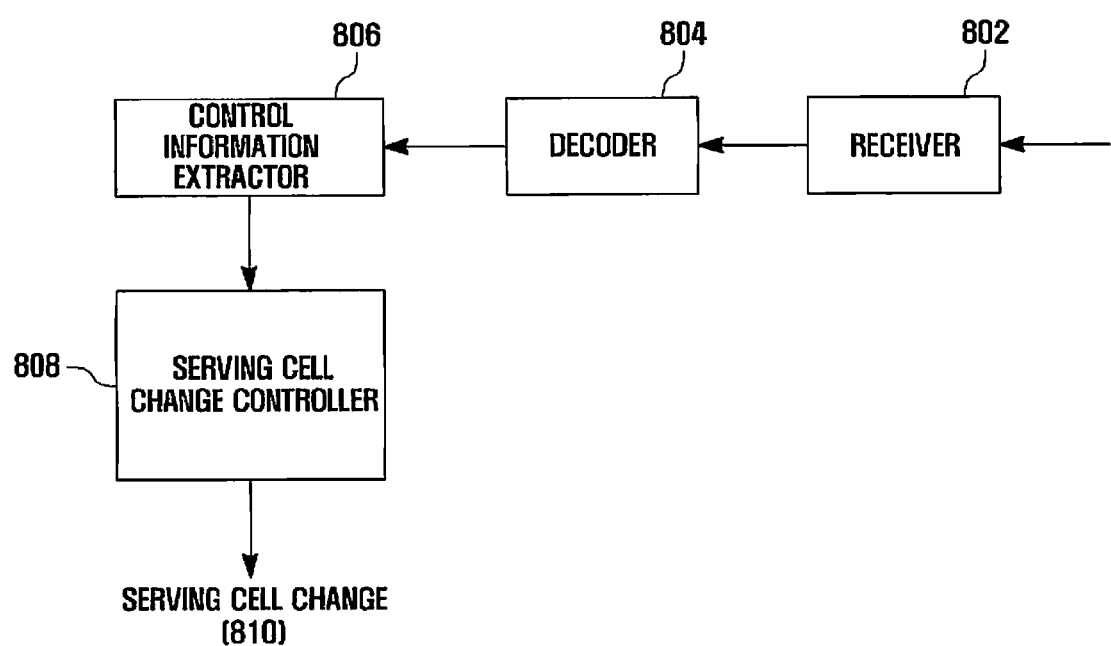
FIG. 8 is a block diagram illustrating a configuration of a receiving apparatus for receiving the serving cell change-related control information of the UE according to an embodiment of the present invention.

FIG. 8 is a block diagram illustrating a configuration of a receiving apparatus for receiving the serving cell change-related control information of UE according to an embodiment of the present invention. For explanation simplicity, descriptions on other internal blocks, except for the receiving apparatus, of the UE are omitted.

Referring to FIG. 8, the receiving apparatus includes a receiver 802, a decoder 804, a control information extractor 806, and a serving cell change controller 808. The receiver 802 performs descrambling and dispreading on the received signal, and the decoder 804 performs channel decoding on the descrambled and dispread signal. The control information extractor 806 extracts the control information from the decoded signal and outputs the serving cell change-related control signal to the serving cell change controller 808. The receiver 802, decoder 804, and the control information extractor 806 can be in the receiving end of the UE. The serving cell change-related control information contains the T_A information of each cell within the active set of the UE. The serving cell change-related control information can include the neighbor cell information (time period information, SRNC/DRNC information, etc.) and a serving cell change indicator which is transmitted by the target cell at an activation time.

The serving cell change controller 808 controls the serving cell change process of the UE based on the input control information. When the cell change control information including the activation time is received from the serving cell, the serving cell change controller 808 controls a transmitter (not shown) of the UE to communicate data with the serving cell and reports, when the downlink channel status of the serving cell is worse than that of the target cell, to the serving cell. Although not depicted in drawing, the transmitter of the UE can be configured with the same structure as shown in FIG. 7, i.e. having a control information generator, an encoder, an RF transmitter. After reporting the channel status, the serving cell change controller 810 of the UE changes its connection to the serving cell during the activation time while monitoring receipt of the serving cell change indicator transmitted by the target cell. If the serving cell change indicator is received from the target cell during the activation time, the serving cell change controller 808 controls such that the UE sends a serving cell change acknowledgement signal and switches the connection to the target cell by means of the RF transmitter (not shown) so as to communicate data with the target cell.

2. Second Embodiment

Figure 9:
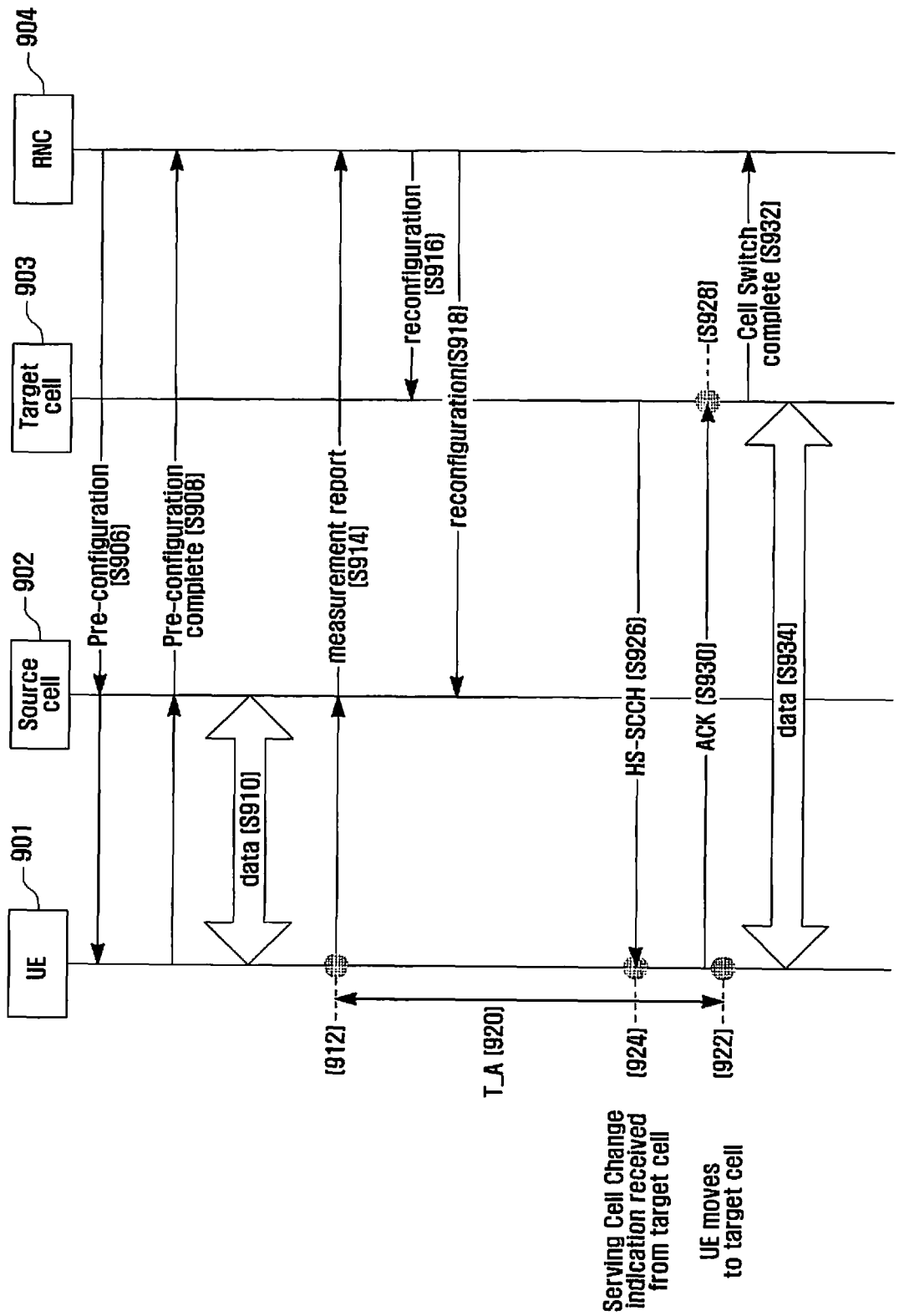
FIG. 9 is a message flow diagram illustrating a serving cell change method for an HSDPA system according to another embodiment of the present invention.

A serving cell change method for an HSDPA system according to another embodiment of the present invention is described hereinafter with reference to FIG. 9. FIG. 9 is a message flow diagram illustrating a serving cell change method for an HSDPA system according to another embodiment of the present invention.

Referring to FIG. 9, the RNC 904 first sends a pre-configuration message containing serving cell change-related control information to the UE 901 via RRC signaling in step S906. The RRC signaling message carrying the serving cell change-related control information is delivered via the source cell 902 during a radio bearer establishment/reconfiguration procedure or an active set update procedure. The serving cell change control information includes the timing information indicating the time period T_A 920 for the UE 901 to calculate the cell change point in time. The time period 920 is defined for each cell within the active set listing the potential cells to which the UE 901 can perform the cell change and is determined based on the location of the cell in the network and the relative location of the cell to the UE 901. For instance, since it takes a relatively long time to perform the serving cell change to a cell of the DRNC, the time period T_A 920 of the cell under the control of the DRNC is set to a value greater than that of the cell under the control of the SRNC. That is, the time period T_A 920 is determined differently depending on whether the target cell belongs to the DRNC or the SRNC. Upon receipt of the serving cell change-related RRC signaling message, the UE 901 sends a pre-configuration complete message to the RNC 904 via the source cell 902 in step S908. Next, the UE 901 measures the strengths of pilot signals transmitted by the cells within the active set while communicating data with the source cell 902 in step S910.

The UE 901 reports to the RNC 904 the downlink channel status obtained by measuring the signal strengths of the pilot signals of the adjacent cells periodically or when the difference between the pilot signal strengths of the source and target cells 902 and 903 is greater than a predetermined threshold value. In FIG. 9, the UE 901 reports the measurement result to the RNC 904 via the source cell 403 in the form of a Radio Resource Control (RRC) signaling message at the time point referred to as reference number 912 in step S914. The measurement report contains information on the target cell within the active set and a Connection Frame Number (CFN) value calculated from the T_A value preset for the target cell as well as the channel status of the target cell. The CFN indicates the timing for the UE to switch to the target cell in unit of the radio frame or TTI. That is, the T_A value, which is a real number, is converted into a number of the data transmission units to obtain the timing of the cell change. Accordingly, the RNC 904 can check the UE's cell change time point from the CFN value.

If the measurement report is received, the RNC 904 sends the radio link reconfiguration instruction message to both the target cell 903 and the source cell 902 in steps S916 and S918 and thus the target and source cells 903 and 902 reconfigure their radio links.

Next, the UE 901 moves to the target cell 903 at time 922 calculated by adding the T_A of the target cell 903 to the point in time at which the measurement report RRC message is transmitted and communicates data with the target cell 903. The time point 922 corresponds to the CFN obtained from the T_A value set for the target cell.

The second embodiment differs from the first embodiment in that the UE 901 receives the serving cell change indicator and sends the acknowledgement to the target cell before the time point 922. In this case, since the serving cell change is confirmed prior to the preset cell change point in time, the cell change delay can be reduced.

The RNC 901 determines whether to maintain the source cell 902 as the serving cell or to change the serving cell to the target cell 903 based on the measurement report received through the RRC message. When the downlink channel status of the target cell 903 is superior to that of the source cell 902 and the difference is greater than a predetermined threshold value, the RNC 904 determines the serving cell change from the source cell 902 to the target cell 903. Once the serving cell change is determined, the target cell 903 sends the serving cell change indicator to the UE 901 through the downlink control channel, i.e. HS-SCCH, prior to the time point 922 such that the serving cell change is confirmed before the time point 922. In this case, the UE 901 attempts to receive the HS-SCCH signal from both the source and target cells 902 and 903 between the time points 912 and 922. It is noted that the UE 901 maintains the connection to the source cell 902 during this period. In FIG. 9, the UE receives the serving cell change indicator through the HS-SCCH at the time point 924 in step S926 and sends the serving cell change acknowledgement signal to the target cell 903 in response to the serving cell change indicator in step S930. The serving cell change acknowledgement signal is transmitted in the form of a specific codeword of Channel Quality Information (CQI) for use in HSDPA or piggybacked on the uplink data. Upon receipt of the serving cell change acknowledgement signal, the target cell 903 sends a cell switch complete message to the RNC 904 in step S932 and starts data communication with the UE 901 in step S934.

When the UE 901 fails to receive the serving cell change indication signal before the time point 922 at which the UE 901 is supposed to move to the target cell 903, the UE 901 maintains the connection to the source cell 902.

Figure 10:
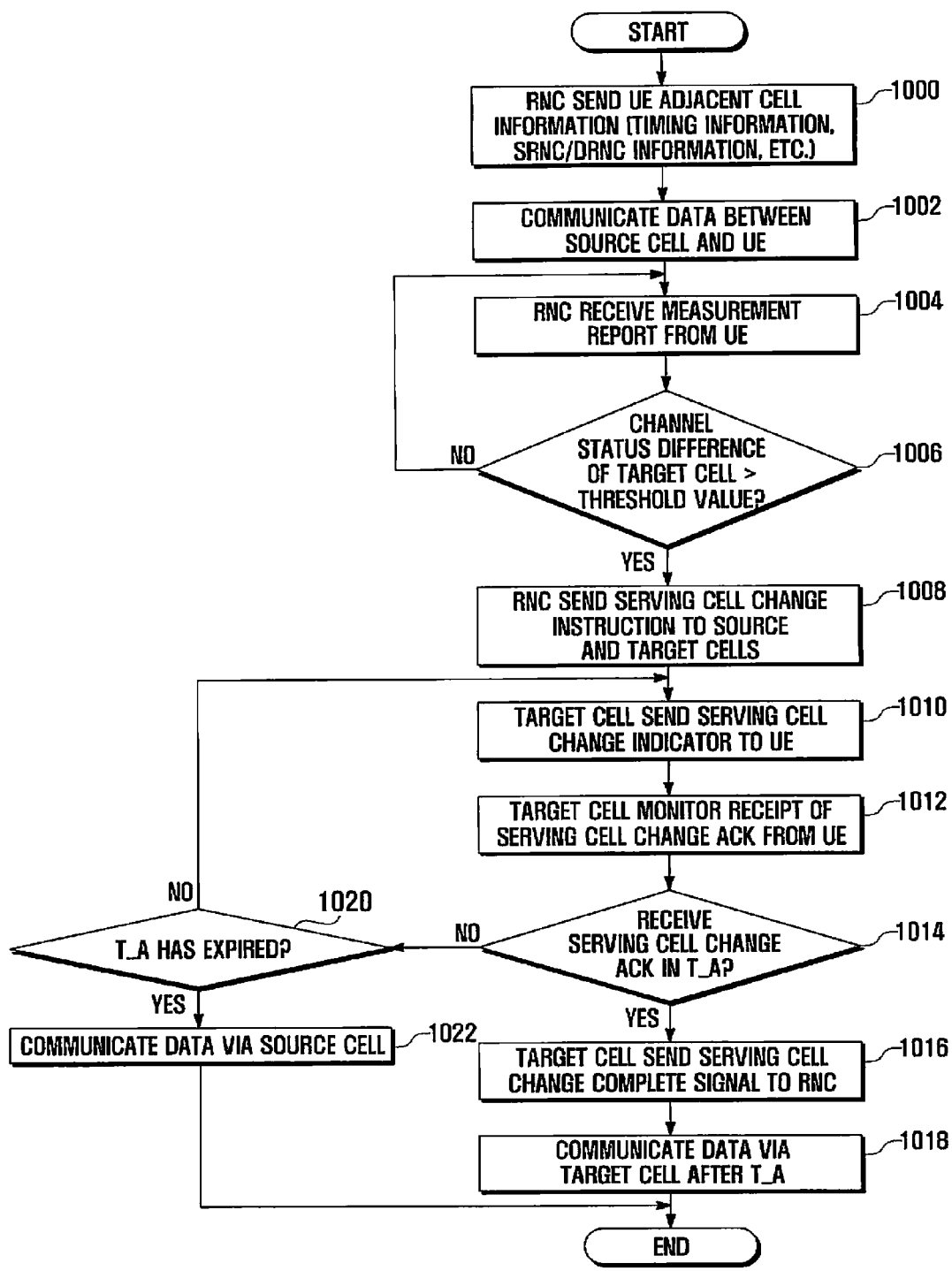
FIG. 10 is a flowchart illustrating the serving cell change method of FIG. 9 in view of the network.

FIG. 10 is a flowchart illustrating the serving cell change method of FIG. 9 in view of the network.

Referring to FIG. 10, the RNC first sends the UE serving cell change-related control information on the cells of the active set in step S1000. The control information includes timing information, i.e. the time period T_A of each cell. The T_A is defined with one of at least two different values determined based on the relative location of the cell to the UE in the network.

Since it takes a relatively long time to perform the cell change to the target cell under the control of the DRNC in comparison with the cell under the control of the SRNC, the T_A of the cell under the control of the DRNC is set to a value greater than that of the cell under the control of the SRNC. That is, the T_A value for each cell is set to one of the values predefined for the DRNC or SRNC. The timing information signaling to the UE can be performed in various manners. First, the RNC informs the UE of the absolute values. Second, the RNC informs the UE of whether each cell belongs to the SRNC or DRNC such that the UE selects one of the time values preset for the SRNC and DRNC. Third, the RNC informs the UE of whether each cell belongs to the SRNC or DRNC together with an offset value such that the UE sets the T_A to a preset value for the cell of the SRNC and to a value obtained by adding the offset to the preset value for the cell of the DRNC. Finally, the RNC informs the UE of whether each cell belongs to the SRNC or DRNC together with an absolute value for the cell of the SRNC and an offset value for the cell of the DRNC such that the UE acquires the value of the T_A for the cells of the SRNC and DRNC. In third and fourth cases, the RNC provides an offset for the cells of the DRNC such that the UE can acquire the timing information for the cells under the control of the DRNC.

The source cell communicates data with the UE in step S1002, and the RNC receives a measurement report transmitted by the UE in step S1004. Upon receipt of the measurement report, the RNC determines whether the the channel status of the target cell is superior to that of the source cell and the difference is greater than a threshold value in step S1006.

If the channel status of the target cell is superior to that of the source cell and the difference is greater than the threshold value, the RNC instructs the source and target cells to prepare for the serving cell change in step S1008. Otherwise, if either the channel status of the target cell is superior to that of the source cell but the difference is not greater than the threshold value or the channel status of the target cell is not superior to that of the source cell, the process returns to step S1004 such that the RNC waits for the measurement result. After preparing the serving cell change, the target cell sends a serving cell change indicator in step S1010. The serving cell change indicator is transmitted through a downlink control channel defined the HSDPA standard, i.e. HS-SCCH. After transmitting the cell change indicator, the target cell waits for receiving a serving cell change acknowledgement signal that is transmitted by the UE S1012 and determines whether the serving cell change acknowledgement signal is received before the period T_A starting at the time when the UE has transmitted the measurement report has expired in step S1014. The serving cell change acknowledgement message can be transmitted in the form of a specific codeword of the CQI control information for HSDPA or by piggybacking on the uplink data. If the serving cell change acknowledgement signal is received in the T_A, the target cell sends a serving cell change complete message to the RNC in step S1016 and starts data communication with the UE at the end of the T_A in step S1018. Otherwise, if the serving cell change acknowledgement signal is not received in the T_A, the target cell determines whether the T_A has expired in step S1020. If the T_A has not expired, the process goes to step S1010 such that the target cell sends the serving cell change indicator to the UE. Otherwise, if the T_A has expired, the source cell maintains the connection to the UE in step S1022.

Figure 11:
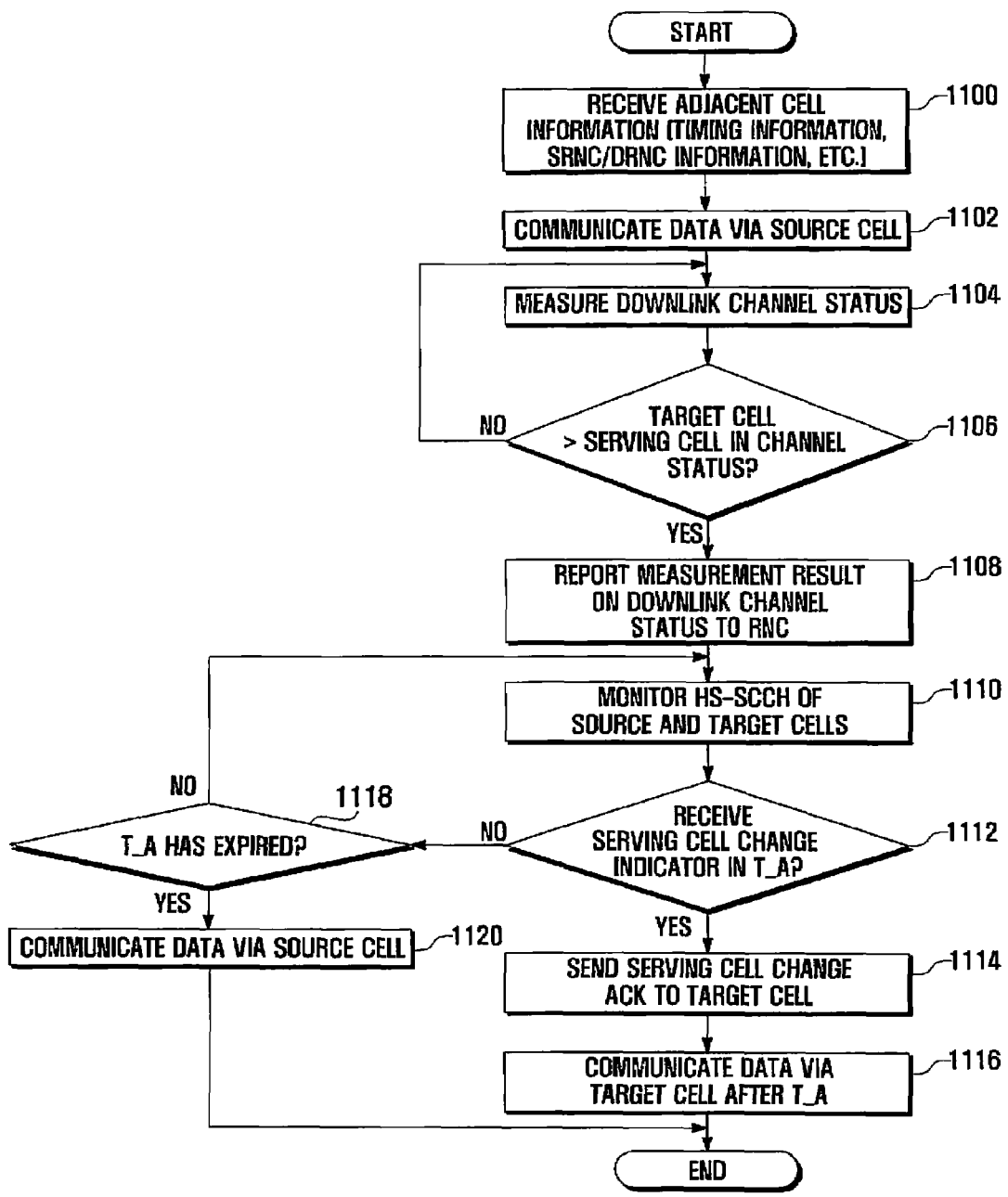
FIG. 11 is a flowchart illustrating the serving cell change method of FIG. 4 in view of the UE.

FIG. 11 is a flowchart illustrating the serving cell change method of FIG. 4 in view of the UE. Referring to FIG. 11, the UE first receives the serving cell change-related control information transmitted by the RNC in step S1100. The control information contains the timing information, i.e. the period T_A per cell. The T_A has two of different values determined based on the relative location of the corresponding cell to the UE in the network.

Next, the UE communicates data with the source cell in step S1102, collects downlink channel status information by measuring the strengths of pilot signals transmitted by adjacent cells in step S1104, and determines whether there is a cell of which channel status is superior to that of the source cell in step S1106. If there is no cell of which channel status is superior to that of the source cell or the measurement report time has not arrived, the UE repeats collecting channel status information at step S1104.

Otherwise, if there is a cell of which channel status is superior to that of the source cell, the UE the measurement result to the RNC in step S1108. Here, the cell of which channel status is superior to that of the source cell is becomes the target cell. After reporting the measurement result, the UE starts monitoring the HS-SCCH from the target cell in step S1110 and determines whether a serving cell change indication signal is received in the T_A in step S1112. The T_A starts at the time when the measurement report is transmitted. If the serving cell change indication signal is received, the UE sends a serving cell change acknowledgement signal to the target cell in step S1114 and starts data communication with the target cell right after the T_A has expired in step S1116.

Otherwise, if the serving cell change indication signal is not received, the UE determines whether the T_A has expired after the transmission of the measurement report in step S1118. If the T_A has not expired, the process goes to step S1110 such that the UE maintains monitoring the HS_SCCH. Otherwise, if the T_A has expired, the UE maintains the connection to the source cell in step S1120.

3. Third Embodiment

In a further embodiment, an additional operation is added right before the UE changes its serving cell to improve the system performance.

Figure 12:
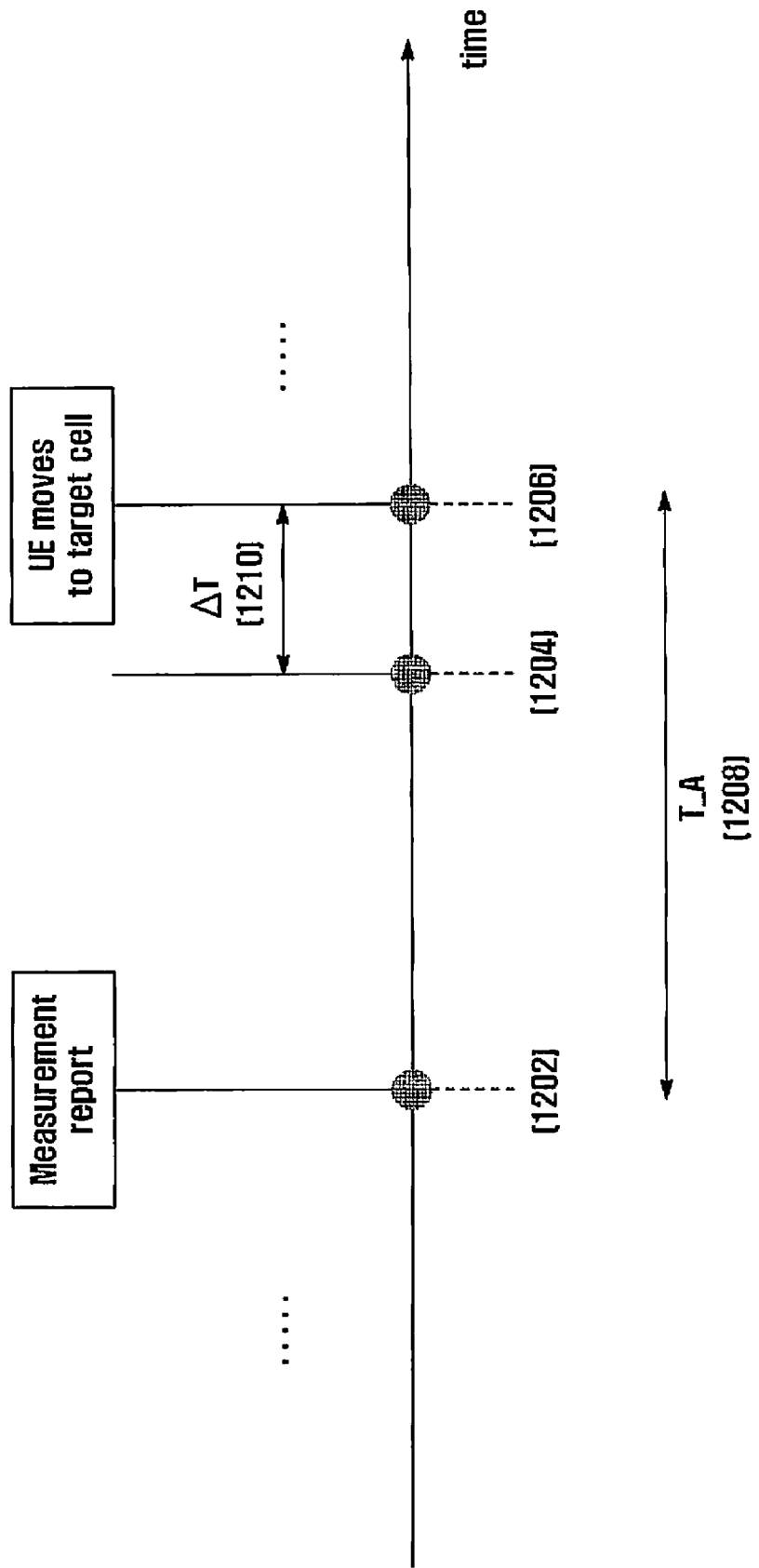
FIG. 12 is a diagram illustrating a serving cell change method according to a further embodiment of the present invention.

FIG. 12 is a diagram illustrating a serving cell change method according to a further embodiment of the present invention. In FIG. 12, the horizontal axis is the time axis.

Referring to FIG. 12, the UE sends the RNC the measurement report containing channel status information of the target cell at a time point 1202. Next, the UE changes its serving cell to the target cell at time point 1206 at which the activation time T_A preset for the target cell expires. Before the time point 1206, the UE maintains data communication with the source cell. During the communication with the source cell, the UE sends the source cell the ACKnowledgement/NegativeACKnowledgement (ACK/NACK), as the response to the downlink data, and the CQI information indicating the downlink channel status. The UE requests the source cell to transmit new data with the ACK and to retransmit the previous data with the NACK. However, sending the source cell the ACK/NACK during a duration A T right before the time point 1206 is useless and causes unnecessary waste of resource because the UE changes its serving cell to the target at the time point 1206. In this embodiment, the UE stops sending the source cell the ACK/NACK during ΔT. The UE also sends the CQI information on the downlink channel status of the target cell during the duration ΔT for the target cell to schedule the UE before the change of serving cell, such that the UE can be scheduled more fairly for data communication after the time point 1206. Preferably, the duration ΔT is set to a small time value right before the time point 1206 at which the UE change its serving cell. For instance, the duration ΔT can be set to one TTI or a processing time of the Node B of the target cell. The processing time means the time period during which the target cell acquires the CQI from the UE and generates a scheduling command.

This feature of the third embodiment can be applied to the serving cell change methods of the first and second embodiments.

Although embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

As described above, the serving cell change method for a wireless communication system, such as HSDPA and LTE systems, according to the present invention sets an activation time to different values depending on whether the potential target cell belongs to the SRNC or DRNC and allows the UE to receive the signal from the target cell during the activation time, thereby reducing serving cell change delay and call drop probability.

What is claimed is:

1. A cell change method for a user equipment in a mobile communication system, comprising:

receiving, from a serving cell, cell change control information including an activation time;

when a downlink channel status of the serving cell is inferior to a downlink channel status of a target cell, reporting a measurement result of the channel status to the serving cell while performing data communication with the serving cell;

monitoring receipt of a cell change indicator transmitted by the target cell before the expiration of the activation time while performing the data communication with the serving cell; and when the cell change indicator is received, communicating data with the target cell by sending an acknowledgement in response to the cell change indicator and switching to the target cell.

2. The cell change method of claim 1, wherein the activation time is transmitted by a Radio Network Controller (RNC) connected to the serving cell and when the RNC is a drift RNC (DRNC), the activation time is set to a duration longer than a duration when the RNC is a serving RNC, the serving RNC being responsible for communicating data with a core network, and the drift RNC being connected to the core network via the serving RNC in view of the user equipment.

3. The cell change method of claim 2, wherein the activation time includes a first activation time and a second activation time, and the step of monitoring receipt of a cell change indicator, comprises:

communicating data with the serving cell during the first activation time; and switching connection to the target cell after the expiration of the first activation time and monitoring for receipt of the cell change indicator from the target cell during the second activation time.

4. The cell change method of claim 3, wherein the step of monitoring for receipt of a cell change indicator, comprises:

monitoring for receipt of the cell change indicator of the target cell while communicating data with the serving cell during the activation time; and when the cell change indicator is received, switching connection to the target cell at a time point when the activation time expires.

5. The cell change method of claim 3, wherein the step of monitoring for receipt of a cell change indicator, comprises performing data communication with the serving cell during the first activation time, transmitting an acknowledgement to the serving cell, and stopping transmission of the acknowledgement during a predetermined period set right before the end of the second activation time.

6. The cell change method of claim 5, wherein the predetermined period is equal to a processing time of the target cell.

7. A cell change method for a mobile communication system, comprising:

sending, by a serving cell, neighbor cell information including an activation time;

receiving a downlink channel status of a user equipment from the serving cell and determining differences between channel statuses of the serving cell and a target cell;

when the channel status of the target cell is superior to the channel status of the source cell, sending a cell change instruction to the serving and target cells;

sending, by the target cell, a cell change indicator to the user equipment in response to the cell change instruction while communicating data with the serving cell during the activation time; and changing a connection from the serving cell to the target cell by acknowledgement of the user equipment.

8. The cell change method of claim 7, wherein the neighbor cell information includes the activation time and information on a serving Radio Network Controller (RNC) and a drift RNC, the activation time of the drift RNC being greater than the activation time of the serving RNC.

9. The cell change method of claim 8, wherein the activation time includes a first activation time and a second activation time, the user equipment performing data communication with the serving cell during the first activation time and monitoring for receipt of a cell change indicator from the target cell during the second activation time.

10. The cell change method of claim 8, wherein the user equipment changes its connection to the serving cell during the activation time, monitors for receipt of a cell change indicator from the target cell, and when the cell change indicator is receipt, changes connection from the source cell to the target cell at a point in time when the activation time expires.

11. The cell change method of claim 8, wherein the user equipment changes its connection to the serving cell during the activation time, transmits acknowledgements to the serving cell, and stops transmitting acknowledgements at a predetermined time point set prior to the end of the activation time.

12. A cell change apparatus of a user equipment in a mobile communication system, comprising:
- a receiver for extracting neighbor cell information including an activation time from a received signal and control information including a serving cell change indicator from a signal transmitted by a target cell during the activation time;
- a serving cell change controller for controlling the user equipment to communicate data with the serving cell, report a measurement result to the serving cell when a downlink channel status of the serving cell is inferior to a downlink channel status of the target cell, maintain the data communication with the serving cell after reporting the measurement result, monitor receipt of the cell change indicator transmitted by the target cell, send the target cell a cell change acknowledgement in response to the cell change indicator, and change a connection from the serving cell to the target cell for data communication; and
- a transmitter for generating control information of the user equipment and sends the control information under the control of the serving cell change controller.

* * * * *